Patented Mar. 8, 1932

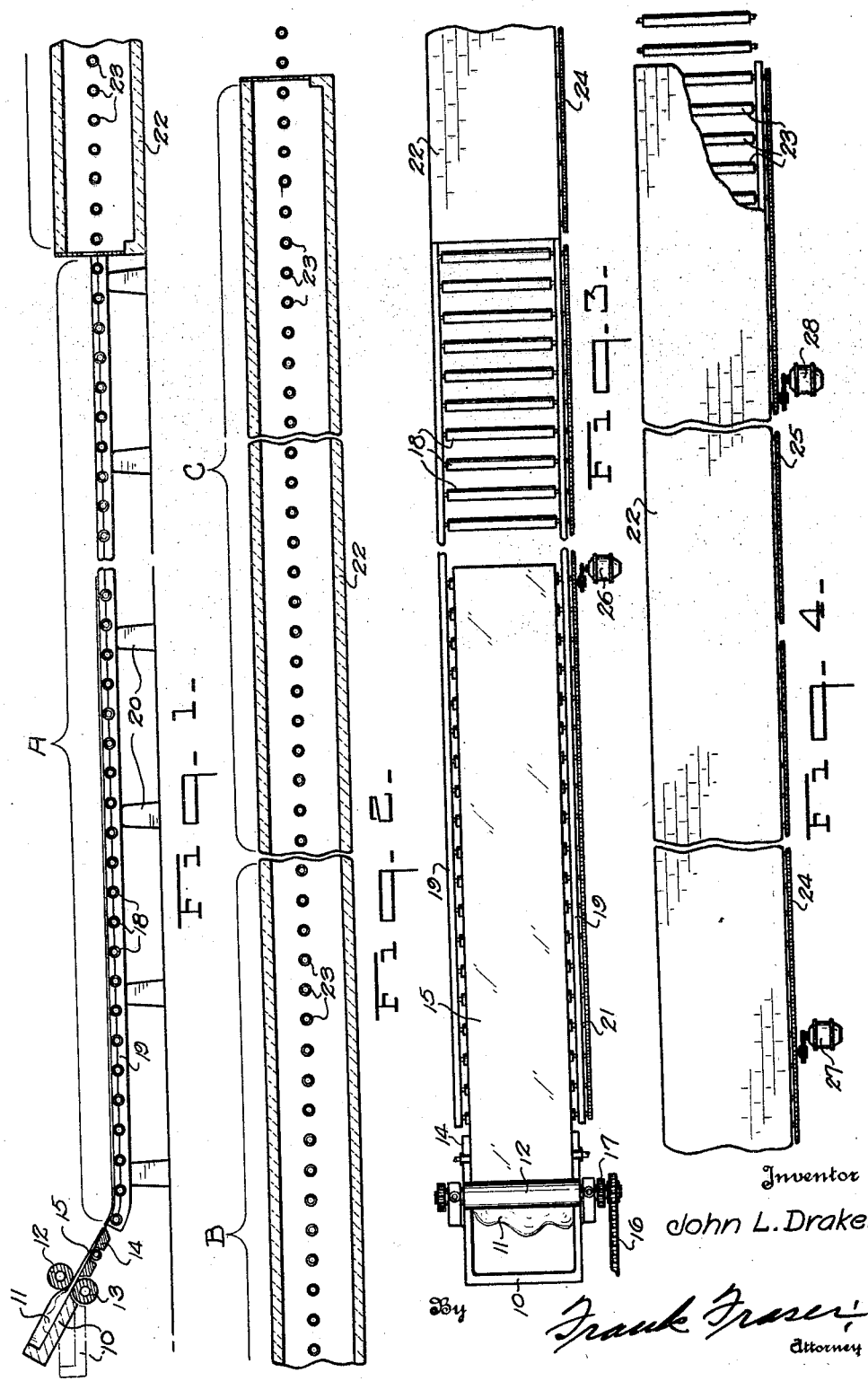

1,848,117

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR FORMING AND ANNEALING SHEET GLASS

Application filed September 18, 1929. Serial No. 393,533.

The present invention relates to an improved process and apparatus for forming and annealing sheet or plate glass.

According to the invention, a plurality of successive sheets of glass are adapted to be formed by an intermittent casting and rolling operation. It is desirable, in order to increase production and improve the quality of the glass sheets, that they be formed at a relatively high rate of speed such as for example, approximately sixty feet per minute, although this speed may be increased or decreased if preferred. A considerable length of time is ordinarily required to properly anneal the glass sheets and were the sheet carried entirely through the annealing leer at the same high rate of speed at which it was formed, it will be apparent that the leer would necessarily have to be of considerable length. However, it is preferred, although not necessary, that the annealing operation be a continuous one, or, otherwise stated, that the glass be kept in constant motion until it is properly annealed or at least until it has become substantially set.

The object of this invention resides broadly in the provision of a process and apparatus wherein the glass sheets may be formed at a relatively high rate of speed and subsequently continuously annealed while traveling at a speed relatively less than the forming speed. Thus, the process and apparatus herein provided will embody those advantages incident to the rapid reduction of the molten glass to sheet form and likewise those advantages which result from slower annealing of the glass.

Another object of the invention is the provision of such a process and apparatus wherein successive sheets of glass are formed and carried continuously forwardly into and through an annealing leer, the sheet being caused to travel at variable speeds subsequent to its formation but prior to annealing, in order that the desired cooling and setting of the sheet may be effected and the annealing thereof may be both facilitated and improved.

A further object of the invention is to provide such a process and apparatus wherein the glass sheet is formed at a relatively high rate of speed after which it is caused to travel at a somewhat slower speed in order to permit the desired cooling and setting of the sheet, the speed of the sheet being then greatly increased above its forming speed to effect the transfer thereof quickly into an annealing leer after which the speed of travel of the sheet is again reduced and the said sheet carried through the leer at a speed relatively less than its speed of formation.

Other objects and advantages of the invention will become more apparent during the course of the following description when taken in connection with the accompanying drawings.

In the drawings wherein like numerals are employed to designate like parts throughout the same, Fig. 1 is a vertical longitudinal section through the forward end portion of apparatus provided by the present invention, Fig. 2 is a similar view of the rear end portion of the apparatus, and Figs. 3 and 4 are plan views of Figs. 1 and 2 respectively.

Referring to the drawings, the means herein employed in the formation of the glass sheets comprises a receiver or support 10 upon which is adapted to be deposited a mass of molten glass 11 to be reduced to sheet form. This mass of molten glass is preferably supplied to the receiver 10 when the same is in a substantially horizontal position as indicated by the broken lines in Fig. 1, from a suitable pot or receptacle (not shown) but within which the molten glass has been preferably melted and refined. Associated with one end of the receiver 10 are the substantially superimposed forming rolls 12 and 13, spaced from one another to create a sheet forming pass therebetween through which the molten glass 11 is moved and reduced to a sheet 14 of substantially predetermined and uniform thickness. The receiver 10 and upper forming roll 12 are preferably mounted so that they are movable as a unit about the axis of rotation of the lower forming roll 13 so that after the glass is deposited upon the receiver 10 while in a horizontal position, said receiver may be tilted to the position indicated by the full lines to advance the molten glass downwardly between the forming rolls. An inclined runway or apron 14 may be positioned as shown to receive the glass sheet 15 issuing from between the forming rolls and to guide and support the same during its inclined downward travel.

As brought out above, it is desirable that the glass sheet be formed at a relatively high rate of speed and the forming rolls 12 and 13 are consequently rotated in a manner that their peripheral speed will be such that they will act to rapidly reduce the mass of molten glass 11 to sheet form. One of the forming rolls may be positively driven such as through a chain drive 16 and the other forming roll is driven from the positively driven roll through intermeshing gears 17 carried by the roll shafts.

Positioned to receive the sheet 15 from the inclined runway 14 is a receiving conveyor table or cooling section A composed of a plurality of horizontally arranged rolls 18 carried by shafts journaled in the side members 19, supported by the vertical uprights or columns 20. The rolls 18 are all adapted to be driven in unison at the same speed and to accomplish this, the shaft supporting each roll may have keyed thereto a sprocket (not shown) and about all of the sprockets may be trained a single sprocket chain 21 driven from a variable speed motor 26 or any other suitable source of power.

Arranged at the end of the cooling section A is a leer 22 within which is mounted a large number of rolls 23 in horizontal alignment with the rolls 18 of conveyor table A. The rolls 23 in leer 22 are divided into two units or sections B and C, the section B being termed the transfer or intermediate section and C the annealing section. The rolls 23 of the transfer section B are also driven in unison at the same speed from a variable speed motor 27 through a sprocket chain 24 trained about sprockets (not shown) keyed to the roll shafts. The rolls of the annealing section C are likewise rotated in unison by a sprocket chain 25 driven from a motor 28. Thus, the rolls of cooling section A, transfer section B, and annealing section C are driven independently of one another.

Briefly stated, the rolls of the cooling section A are adapted to travel at the speed of formation of the sheet, at a relatively slower speed, and also at a relatively higher speed. The rolls of the transfer section B are adapted to be driven at a high speed equal to the high speed of section A and at a relatively slower speed which is equal or substantially equal to the speed of the rolls of the annealing section C which are adapted to be driven at all times at a constant speed.

In carrying out the invention into practice, a mass of molten glass 11 is first deposited upon the receiver 10, after which the receiver is tilted and the glass passed to the forming rolls 12 and 13 and reduced thereby to sheet form. The sheet is rolled at a relatively high rate of speed, for example, approximately sixty feet per minute and during the formation of the sheet, the rolls 18 of cooling section A are adapted to travel at the same rate of speed to receive the glass sheet thereupon from the runway 14. After the entire sheet has been deposited upon the section A, the speed thereof is slowed down to approximately fifteen feet per minute and allowed to run at this speed for a short time, say about two minutes, in order to permit the desired cooling and setting of the glass sheet. The principal advantage of the slow speed during cooling is to allow for sufficient cooling time without the necessity of adding length to the leer. When the sheet has become cooled and set to the desired extent, the speed of the cooling section A is increased to a speed greater than the rolling speed such as for example three hundred feet per minute in order to quickly transfer the glass sheet from conveyor table A into the leer 22 where it will be received upon the rolls of the intermediate or transfer section B. During the time the glass is being transferred onto section B from section A, the rolls of section B will be synchronized with the rolls of section A or, in other words, will also be traveling at the rate of approximately three hundred feet per minute. After the glass sheet has been transferred onto section B, the latter is slowed down to approximately fifteen feet per minute, and the glass passed onto the rolls of section C which always travel at a constant speed which is the same or slightly greater than the slow speed of the transfer section B, such as for example sixteen feet per minute. The sheet is then carried at this speed through the annealing leer to effect the proper annealing thereof. By driving the rolls of the annealing section C at a slightly higher speed than the rolls of transfer section B during the transfer of the sheet from section B to section C, the sheet will be maintained under a slight tension to prevent sagging thereof. The exact relative speeds of the several sections as given above are by way of example only since such speeds may be varied as desired without departing from the spirit of the invention.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of forming and annealing sheet glass, consisting in reducing a mass of molten glass to sheet form at a relatively high rate of speed, annealing the sheet while traveling at a relatively slower speed, and in successively decreasing and then increasing the speed of travel of the sheet subsequent to its formation and prior to the annealing thereof.

2. The process of forming and annealing sheet glass, consisting in reducing a mass of molten glass to sheet form at a predetermined rate of speed, decreasing the speed of the sheet subsequent to its formation to allow the desired cooling and setting thereof, in then increasing the speed of the sheet to effect its transfer into an annealing chamber, and in finally decreasing the speed of the sheet and annealing it while traveling at this decreased speed.

3. The process of forming and annealing sheet glass, consisting in rolling a mass of molten glass to sheet form at a relatively high rate of speed, reducing the speed of travel of the sheet subsequent to its formation to allow the desired cooling and setting thereof, then increasing the speed of travel of the sheet to a point above the rolling speed to effect its transfer into an annealing chamber, and in finally reducing the speed of the sheet to a point below the rolling speed and annealing it while traveling at such speed.

4. The process of forming and annealing sheet glass, consisting in reducing a mass of molten glass to sheet form at a predetermined rate of speed, annealing the sheet while traveling at a relatively slower speed and in causing the sheet to travel subsequent to its formation and prior to the annealing thereof at a plurality of intermediate speeds, one of said speeds being slower than the speed of formation and one greater than the speed of formation.

5. In apparatus for forming and annealing sheet glass, means for reducing a mass of molten glass to sheet form, an annealing leer, and horizontal conveying means for receiving the sheet from the forming means and carrying it into and through said leer including a variable speed receiving section, a variable speed transfer section and a constant speed annealing section.

6. In apparatus for forming and annealing sheet glass, means for reducing a mass of molten glass to sheet form, an annealing leer, and horizontal conveying means for receiving the sheet from the forming means and carrying it into and through said leer including a variable speed receiving section exteriorly of the leer, a variable speed transfer section within the leer, and a constant speed annealing section also within said leer.

7. In apparatus for forming and annealing sheet glass, means for reducing a mass of molten glass to sheet form, an annealing leer, and horizontal conveying means for receiving the sheet from the forming means and carrying it into and through said leer including a receiving section adapted to travel at the speed of formation of the sheet and also at a slower speed and a higher speed, a transfer section adapted to travel at a speed equal to the high speed of the receiving section and at a lower speed, and an annealing section traveling at a constant speed approximately that of the slow speed of said transfer section.

8. In apparatus for forming and annealing sheet glass, means for reducing a mass of molten glass to sheet form, an annealing leer, and horizontal conveying means for receiving the sheet from the forming means and carrying it into and through said leer including a receiving section, means for driving said section at the speed of formation of the sheet and also at a slower speed and a higher speed, a transfer section for receiving the sheet from the receiving section, means for driving the transfer section at a speed equal to the high speed of the receiving section and at a lower speed, an annealing section for receiving the sheet from the transfer section, and means for driving the annealing section at a constant speed approximately equal to the slower speed of said transfer section.

Signed at Toledo, in the county of Lucas and State of Ohio, this 14th day of September 1929.

JOHN L. DRAKE.